United States Patent Office 3,507,880
Patented Apr. 21, 1970

3,507,880
N-SUBSTITUTED IMIDES, ACID-AMIDES
AND ESTER AMIDES
Elmar R. Altwicker, Somerville, N.J., assignor to Universal Oil Products Company, Des Plaines, Ill., a corporation of Delaware
No Drawing. Filed Aug. 11, 1966, Ser. No. 571,712
Int. Cl. C07d 27/52
U.S. Cl. 260—326                    10 Claims

ABSTRACT OF THE DISCLOSURE

Compounds having the following formulae

[Formula showing structure with $R_1$, $R_2$, $R_3$, $(CH_2)_n$, B, D groups]

or

[Second formula structure]

or

[Third formula structure with $Z_1$]

or

[Fourth formula structure with $Z_2$]

wherein $R_1$ and $R_2$ are independently selected from the group consisting of hydrogen and alkyl; $R_3$ is hydrogen or alkyl; $Z_1$ and $Z_2$ are vivalent mono-nuclear carbocyclic radicals; $n$ is an integer of 0 to about 6; B is a phenylene group; and D is alkyl, cycloalkyl or aryl. The compounds are useful as stabilizing additives for lube oils, solid polyolefins, rubber and other organic material which is deleteriously affected by the action of ozone or oxygen.

This invention relates to a new class of compounds and to compositions containing such compounds which are stabilized against deterioration caused by the action of ozones or oxygen. More particularly, this invention relates to a novel class of N-substituted imides and N-substituted acid-amides or ester-amides.

The novel compounds of this invention have the following structural formulae:

[Formula I with $R_1$, $R_2$, $(H)_y$, $(CH_2)_n$, $R_3$, B, D]
(I)

or

[Formula II structure]
(II)

where $R_1$ and $R_2$ when taken independently of each other are members selected from the group consisting of hydrogen or alkyl and when taken together and with the connecting bridges

[structures showing ring forms or $(CH_2)_n$]

constitute members selected from an alicyclic or aromatic ring, $n$ is an integer of 0 to about 6, $R_3$ is a member selected from the group consisting of hydrogen or alkyl, B is a phenylene group, D is a member selected from the group consisting of alkyl, cycloalkyl, or aryl and $y$ is an integer of 0 or 1; provided that when $R_1$ and $R_2$ and the connecting bridges form an aromatic ring, $y$ is 0.

The novel imides or acid-amides or ester amides of this invention having the above general Formula I or II find wide utility in the chemical field and are especially useful as plasticizers, ingredients of synthetic waxes or resins, precursors for pharmaceuticals or insecticides, or as antiozonants and antioxidants. Of these many uses, however, one of the more valuable present uses for these compounds is the stabilization of compositions against the deteriorating effects of oxygen or ozone. Of considerable significance in this respect is that certain of these compounds, and particularly the compounds where the $R_1$ and $R_2$ groups and the connecting bridges of the above Formula I or II form alicyclic rings, for example cyclohexene, are highly effective in the stabilization of rubbery polymers against ozone or oxygen attack.

The amide compounds of this invention, represented by Formula I, may be prepared in general by reacting an acid compound with a diamine compound to form either an acid-amide, represented by Formula I where $R_3$ is hydrogen, or an ester-amide, represented by Formula I where $R_3$ is alkyl. The imide compounds, represented by Formula II, may be prepared in general by first preparing a corresponding acid-amide represented by Formula I where $R_3$ is hydrogen and $n$ is 0, followed by subjecting such acid-amide to a ring closure reaction.

The acid-amides of this invention, represented by Formula I above where $R_3$ is hydrogen, may be prepared specifically by reacting an acid compound comprising a dicarboxylic acid of the formula:

[Formula III structure with $R_1$, $R_2$, $(H)_y$, $(CH_2)_n$]
(III)

and, when $n$ is 0, its corresponding anhydride; with a diamine compound of the formula:

$$H_2N-B-\underset{\underset{D}{|}}{N}-D$$ (IV)

where $R_1$, $R_2$, B, D, $n$, and $y$ have the same meaning as above for Formula I.

Examples of the dicarboxylic acid having the Formula III above which may be used as the acid compound in the reaction include: where $R_1$ and $R_2$ are alkyl or hydrogen groups and preferably lower alkyl of from 1 to about 5 carbon atoms, such acids as succinic, 2-methylsuccinic, 2,3 - diethylsuccinic, 2,3 - dipropylsuccinic, 2 - butylsuccinic, 2,3 - diphentylsuccinic, glutaric, 2 - methylglutaric, 2,4 - diethylglutaric, adipic, 2,5 - diethyladipic, sebacic, or 2,9 - diethylsebacic; where $R_1$ and $R_2$ together with the

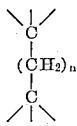

bridge form an alicyclic ring and preferably a monoalicyclic ring such as a cycloalkane or a cycloalkene ring of from 5 to about 7 carbon atoms, such acids as 1,2-cyclopentanedicarboxylic, 1,3 - cyclopentanedicarboxylic, 1,2 - cyclopent - 4 - enedicarboxylic, 1,2 - cyclohexanedicarboxylic, 1,3-cyclohexanedicarboxylic, 1,2-cyclohex-4-enedicarboxylic, 1,2-cycloheptanedicarboxylic, 1,2 - cycloheptanedicarboxylic, 1,2-cyclohept - 4 - enedicarboxylic, 1,3 - cycloheptanedicarboxylic or 1,4-cycloheptanedicarboxylic; or where $R_1$ and $R_2$ together with the

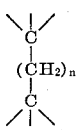

bridge form an aromatic ring such as naphthalene or benzene, such acids as 1,2-benzenedicarboxylic, 1,3 - benzenedicarboxylic, 1,2 - naphthalenedicarboxylic or 1,4-naphthalenedicarboxylic. As indicated, when $n$ of the above Formula III for the dicarboxylic acid is 0, the acid compound used in the reaction may be a corresponding acid anhydride, examples of which include such anhydrides as succinic anhydride, 1,2-cyclopentanedicarboxylic anhydride, 1,2 - cyclohexanedicarboxylic anhydride, 1,2-cyclohex-4-enedicarboxylic anhydride, 1,2-benzenedicarboxylic anhydride, or 2,3-naphthalenedicarboxylic anhydride. Examples of the diamine compound having the above Formula IV which may be used in reaction include, where D is alkyl and preferably alkyl of from 1 to about 10 carbon atoms, diamines such as N-pentyl-p-phenylenediamine, N-octyl-o-phenylenediamine, N - sec - octyl-p-phenylenediamine, N-sec-nonyl - p - phenylenediamine; where D is cycloalkyl, and preferably cycloalkyl of from 5 to about 7 carbon atoms, diamines such as N-cyclopentyl-p-phenylenediamine, N - cyclohexyl - p - phenylenediamine, N-cycloheptyl-p-phenylenediamine; or, where D is aryl, such as phenyl or naphthyl, diamines such as N-phenyl - p - phenylenediamine, N - phenyl - o - phenylenediamine, N-(1-naphthyl)-p-phenylenediamine, or N-(1-naphthyl)-o-phenylenediamine. The above illustrated specific acid compounds and diamine compounds represent, of course, only a few of the many compounds having the Formulae III and IV, respectively, which may be used to prepared the acid-amides of this invention. It should also be understood that these compounds may be further substituted with such groups as alkyl, halo or alkoxy, examples of which include N-(chlorophenyl)-p-phenylenediamine, N-(methoxyphenyl)-o-phenylenediamine or p-amino-o-methoxyphenylamine.

In effecting the reaction of an acid compound of the above described class with a diamine compound of the above Formula IV to prepare the acid-amides of this invention represented by Formula I, where $R_3$ is hydrogen, the conditions and procedures used may be widely varied. Generally, the conditions and procedures commonly employed in the preparation of amides by the reaction of an amine with an acid or an acid anhydride may be satisfactorily used for the preparation of the compounds of this invention. Typically, the reaction may be conducted by charging the desired diamine and acid compound to a reaction vessel, preferably admixed with a suitable solvent such as benzene or dioxane, followed by stirring and heating the reactants for a period of time sufficient to complete the reaction. The temperature used may be varied but it usually ranges from about 25° to 150° C. with reaction periods ranging from a few minutes to several hours. The ratio of reactants is not too important, but for highly reactive acid compounds the acid compound should be used in a stoichiometric excess above 1 mol of the acid compound per mol of the diamine so as to avoid undesired diamide formation. After the desired acid-amide has formed, it may be recovered from the reaction mixture and purified by conventional procedures including, for example, extraction, crystallization and distillation. Examples of the acid-amides of this invention include:

N-(p-phenylaminophenyl)-3-carboxypropionamide,
N-(o-phenylaminophenyl)-2,4-dipropyl-4-carboxybutyramide,
N-(p-nonylaminophenyl)-9-carboxypelargonamide,
N-(p-octylaminophenyl)-2-carboxycyclopentanecarboxamide,
N-(p-cyclohexylaminophenyl)-4-carboxybutyramide,
N-(o-phenylaminophenyl)-2-carboxycyclohexanecarboxamide,
N-(p-naphthylaminophenyl)-3-carboxycyclohexanecarboxamide,
N-(p-phenylaminophenyl)-2-carboxycyclohex-4-enecarboxamide,
N-(o-phenylaminophenyl)-2-carboxybenzenecarboxamide,
N-(p-phenylaminophenyl)-3-carboxybenzenecarboxamide or
N-(p-phenylaminophenyl)-2-carboxy-1-naphthalenecarboxamide.

The ester-amides of this invention represented by Formula I above where $R_3$ is an alkyl group may be prepared specifically by reacting an acid compound comprising a half-ester of a dicarboxylic acid of the formula:

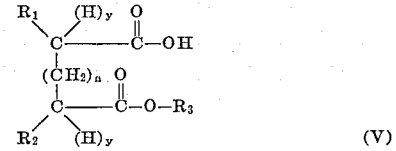

or the corresponding half-acid halides thereof, where $R_1$, $R_2$, $n$ and $y$ have the same meaning as above for Formula I and where $R_3$ is alkyl and preferably alkyl of from 1 to about 16 carbon atoms, with a diamine having the Formula IV above. Examples of the half-esters of dicarboxylic acids having the Formula V which may be used as the acid compound in the reaction include half-esters of the dicarboxylic acids illustrated above for the acid-amide preparation such as:

3-carbononanoxypropionic acid,
4-carbopentoxybutyric acid,
2,4-dipropyl-4-carbodecanoxybutyric acid,
9-carbohexadecanoxypelargonic acid,
2-carbopentoxycyclopentanecarboxylic acid,
2-carbododecanoxycyclohexanecarboxylic acid,
2-carbohexanoxycyclohex-4-enecarboxylic acid,
3-carbononanoxycyclohexanecarboxylic acid,
2-carbononanoxybenzenecarboxylic or
2-carbododecanoxy-1-naphthalenecarboxylic acid.

Examples of the half-acid halides, preferably chlorides, of the above half-esters of dicarboxylic acids which may be used in the reaction as the acid compound include 3-carbononanoxypropionoyl chloride,
2,4-dipropyl-4-carbodecanoxybutyryl chloride,
2-carbododecanoxycyclohexanecarbonyl chloride,
2-carbohexanoxycyclohex-4-enecarbonyl chloride or
2-carbononanoxybenzenecarbonyl chloride.

In effecting the reaction of the acid compounds illustrated above with a diamine of the above Formula IV to prepare the ester-amides of this invention, the conditions and procedures used are basically the same as those used to prepare the acid-amides with the principal deviation being, of course, the use of a different acid compound reactant. Examples of the ester-amides of this invention include:

N-(o-phenylaminophenyl)-3-carbohexanoxypropionamide,
N-(p-phenylaminophenyl)-4-carbopentoxybutyramide,
N-(p-nonylaminophenyl)2,4-dipropyl-4-carbodecanoxybutyramide,
N-(p-naphthylaminophenyl)-9-carbohexadecanoxypelargonamide,
N-(o-phenylaminophenyl)-2-carbopentoxycyclopentanecarboxamide,
N-(o-octylaminophenyl)-2-carbododecanoxycyclohexanecarboxamide,
N-(p-cyclohexylaminophenyl)-2-carbododecanoxycyclohex-4-enecarboxamide,
N-(p-phenylaminophenyl)-2-carbohexanoxycyclohex-4-enecarboxamide,
N-(p-phenylaminophenyl)-3-carbononanoxycyclohexanecarboxamide,
N-(p-phenylaminophenyl)-2-carbohexanoxycycloheptanecarboxamide,
N-(p-phenylaminophenyl)-2-carbododecanoxy-1-naphthalenecarboxamide.

The imides of this invention represented by Formula II above may be prepared specifically by subjecting a corresponding acid-amide to a ring closure reaction. These acid-amides may be represented by Formula I above where $R_3$ is hydrogen and $n$ is 0 and are exemplified by the above illustrated class of acid-amides of this invention where the carboxylic groups are located on adjacent carbon atoms or the 1,2 positions. The ring closure reaction may be effected using the conditions and procedures commonly employed for such reactions which generally involve the use of acidic conditions and elevated temperatures. In carrying out the reaction, the desired acid-amide is charged to a suitable reaction vessel together with a strong acid, for example, sulfuric acid and, if desired, a solvent such as methanol. The mixture is then heated to a temperature ranging from about 50 to 150° C. with atmospheric refluxing temperatures being preferred. The heating is continued for a period of time sufficient to effect the desired ring closure, which usually ranges from a few minutes to about 15 hours. At the completion of the reaction, the imide is recovered from the reaction mixture and purified by conventional procedures including, for example, extraction, crystallization and vacuum fractionation. Examples of the imides of this invention include: N-(o-phenylaminophenyl)-succinimide, N-(p-phenylaminophenyl)-1,2-propanedicarboximide, N-(p-nonylaminophenyl)-1,2-octanedicarboximide, N-(p-naphthylaminophenyl)-6,7-dodecanedicarboximide, N-(p-octylaminophenyl)-1,2-cyclopentanedicarboximide, N-(o-phenylaminophenyl)-1,2-cyclopentenedicarboximide, N-(p-phenylaminophenyl)-1,2-cyclohexanedicarboximide, N-(p-2-naphthylaminophenyl)-1,2-cyclohexanedicarboximide, N-(o-phenylaminophenyl)-1,2-cyclohex-4-enedicarboximide, N-(p-cyclohexylaminophenyl)-1,2-cyclohex-4-enedicarboximide, N-(o-phenylaminophenyl)-1,2-benzenedicarboximide, or N-(p-phenylaminophenyl)-1,2-naphthalenedicarboximide.

As hereinbefore indicated, the novel compounds are particularly useful in stabilizing compositions against the deteriorating effects of oxygen or ozone. The compositions which may be stabilized according to this invention by incorporating these compounds therein, in general, comprise any material which is deleteriously affected by the action of either ozone or oxygen. Examples of these compositions include petroleum products, for example, unsaturated gasolines or lubricating oils; edible fats and oils, for example, linseed oil or lard; polyolefins, for example, polyethylene or polypropylene; olefin copolymers, for example, ethylene and propylene; rubbery polymers including both natural rubber and synthetic rubber, for example, homo-polymers or copolymers of butadiene, isoprene, and similar aliphatic conjugated diolefin hydrocarbons, such as butadiene-styrene copolymer rubber, butadiene-vinyl-pyridine copolymer rubber, isobutylene-isoprene copolymer rubber, ethylene-propylene-conjugated diolefin or non-conjugated diolefin terpolymer or polychloroprene.

The compounds of this invention may be added to the above illustrated class of compositions, either individually or in admixture, according to any of the standard procedures commonly used for incorporating antiozonants or antioxidants into polymeric materials. These compositions may also, if desired, contain additional conventional antioxidants or antiozonants which, in combination with the compounds of this invention, may result in the formation of synergistic compositions. The amount of the compounds of this invention added to stabilize the compositions may be widely varied with the particular amount added in any case being dependent upon such factors as the particular composition being stabilized, the particular stabilizing compound or compounds being added, and whether the composition is being stabilized against oxidation or ozonolysis or both. For example, in the instance where rubbery polymers are being stabilized, the amount of the compound added usually ranges from about 0.05 to 10 weight parts per 100 weight parts of the rubber polymer, with from about 0.1 to 5 weight parts per 100 weight parts usually being preferred.

The following examples are cited to illustrate the novel compounds of this invention and the stabilized compositions containing such compounds. They are not, however, intended to limit the broad scope of this invention to the specific compounds and compositions illustrated therein.

EXAMPLE I

N-(p-phenylaminophenyl)-2-carboxycyclohex-4-enecarboxamide was prepared by the following procedure:

About 100 grams (0.544 mol) of p-aminodiphenylamine and 272 milliliters of p-dioxane were charged to a reaction flask equipped with heating and mixing means. With stirring, about 86.6 grams (0.544 mol) of 1,2-cyclohex-4-enedicarboxylic anhydride in 100 milliliters of warm benzene (50° C.) were added to the flask. Crystals immediately formed and after stirring for about 10 minutes, the crystals were separated from the reaction mixture by filtration and washed with benzene. The washed crystals were recrystallized from benzene to yield 182.6 grams of product having a melting point of 108° to 110° C.

EXAMPLE II

N-(p-phenylaminophenyl)-1,2-cyclohex-4-enedicarboximide was prepared according to the following procedure:

About 10 grams of the N-(p-phenylaminophenyl)-2-carboxycyclohex-4-enecarboxamide prepared as in Example I together with 50 milliliters of anhydrous methanol and 2.5 milliliters of concentrated sulfuric acid were charged to a reaction flask and heated at reflux (65° C.) for about 2 hours. The mixture was cooled to about 25° C., diluted with 3 volumes of water, and the organic material extracted from the mixture with benzene. The benzene extract was washed with water, and a sodium carbonate solution and then dried over sodium sulfate. The extract was distilled to remove the benzene and the residue crystallized from ethyl acetate to recover 4 grams of product having a melting point of 129.5° to 130.5° C.

EXAMPLE III

N-(p-phenylaminophenyl)-2-carbomethoxycyclohex-4-enecarboxamide was prepared according to the following procedure:

About 5.5 grams (0.03 mol) of p-aminodiphenylamine, 100 milliliters of benzene and 1 milliliter of pyridine were charged to a reaction flask equipped with heating and mixing means. With stirring, about 6 grams (0.03 mol) of 2 - carbomethoxycyclohex - 4 - enecarbonylchloride were added and the mixture was warmed on a steam bath for 2 minutes. The mixture was then cooled and concentrated to dryness by vacuum distillation. The residue was mixed with water and ethyl acetate and the ethyl acetate layer was separated, washed with water, dried over sodium sulfate and concentrated to dryness by vacuum distillation. The remaining residue crystallized at about 25° C. The crystals were washed with ethyl acetate to recover 3 grams of a white crystalline product having a melting point of 146° to 151° C.

EXAMPLE IV

Certain compounds of this invention were evaluated as antioxidant additives as follows.

A natural rubber tread stock of the recipe—

| Ingredient: | Parts by weight |
|---|---|
| Smoked sheet | 100.00 |
| Statex R | 45.00 |
| Zinc oxide | 5.10 |
| Stearic acid | 3.00 |
| Sulfur | 2.50 |
| Santocure | 0.75 |
| Antioxidant | As indicated | was cured for 40 minutes at 140° C. The cured rubber was then cut into test strips and aged for 1, 2, 4 and 7 day periods at 90° C. The strips were then subjected to the following tests, together with blank samples containing no antioxidant and the results are reported in Table I below. The compounds tested, the concentrations and code numbers for Table I are as follows:

| Compound | Code | Concentration parts per 100 parts of rubber |
|---|---|---|
| N-(p-phenylaminophenyl)-1,2-cyclohex-4-ene-dicarboximide | 1 | 3.00 |
| N-(p-phenylaminophenyl)-2-carboxycyclohex-4-enecarboxamide | 2 | 2.00 |
| Do | 3 | 3.00 |
| N-(p-phenylaminophenyl)-2-carbomethoxycyclohex-4-enecarboxamide | 4 | 3.00 |

| Ingredient: | Parts by weight |
|---|---|
| Stearic acid | 2.00 |
| Sulfur | 2.00 |
| Santocure | 1.25 |
| N - (p - phenylaminophenyl) - 2 - carboxycyclohex - 4 - enecarboxamide | 3.00 | was cured for 40 minutes at 140° C. and then cut into test strips of 1 inch by 4 inches. Different series of test strips were then elongated 10%, 15% and 20% respectively, and the elongated strips were mounted on panels. The panels were placed in an ozone cabinet and subjected to an atmosphere containing 50 parts of ozone per 100 million parts of air at 100° F. and the time to first crack is noted. The results of this evaluation as compared to the results obtained for a control sample of the same rubber containing no additive are reported in the following Table II.

TABLE II

| | Hours to first crack elongation | | |
|---|---|---|---|
| | 10% | 15% | 20% |
| Rubber without additive | 0-1 | 0-1 | 0-1 |
| Rubber with additive | 1-2 | 1-2 | 1-2 |

The above test was repeated using three different series of rubber samples containing the following antiozonant additives:

| Sample | Additive | Concentration per 100 parts of rubber |
|---|---|---|
| 1 | N-(p-phenylaminophenyl)-2-carboxycyclohex-4-enecarboxamide. | 3.00 |
| 2 | N,N'-di-(1-methylheptyl)-p-phenylenediamine (standard antiozonant). | 1.5 |
| 3 | N-(p-phenylaminophenyl)-2-carboxycyclohex-4-enecarboxamide and N,N'-di-(1-methylheptyl)-p-phenylenediamine (standard antiozonant). | 1.5<br>1.5 |

The results of these tests are reported below in Table III and from these data it can be observed that the mixture of the compound of this invention with the Standard Antiozonant in Sample 3 results in a synergistic mixture

TABLE I

| | Shore A hardness | | | | | Ultimate elongation, percent | | | | |
|---|---|---|---|---|---|---|---|---|---|---|
| Days aged | 0 | 1 | 2 | 4 | 7 | 0 | 1 | 2 | 4 | 7 |
| Sample No.: | | | | | | | | | | |
| Blank | 66 | 66 | 64 | 62 | 69 | 485 | 380 | 290 | 200 | 50 |
| 1 | 68 | 71 | 70 | 70 | 68 | 495 | 445 | 380 | 335 | 260 |
| 2 | 68 | 67 | 69 | 67 | 69 | 495 | 415 | 410 | 355 | 240 |
| 3 | 69 | 70 | 71 | 70 | 70 | 515 | 455 | 445 | 400 | 295 |
| 4 | 67 | 71 | 68 | 69 | 69 | 430 | 405 | 360 | 310 | 245 |

| | 200% modulus, p.s.i. | | | | | 300% modulus, p.s.i. | | | | | Tensile strength, p.s.i. | | | | |
|---|---|---|---|---|---|---|---|---|---|---|---|---|---|---|---|
| Days aged | 0 | 1 | 2 | 4 | 7 | 0 | 1 | 2 | 4 | 7 | 0 | 1 | 2 | 4 | 7 |
| Sample No.: | | | | | | | | | | | | | | | |
| Blank | 1,140 | 1,155 | 1,130 | 960 | ------ | 2,140 | 2,145 | 1,980 | ------ | ------ | 3,815 | 2,885 | 1,940 | 960 | 295 |
| 1 | 1,090 | 1,210 | 1,370 | 1,340 | ------ | 1,870 | 2,200 | 2,365 | 2,365 | ------ | 3,785 | 3,530 | 3,215 | 2,660 | 1,760 |
| 2 | 1,010 | 1,265 | 1,215 | 1,155 | 1,210 | 1,905 | 2,285 | 2,265 | 2,160 | ------ | 3,725 | 3,605 | 3,375 | 2,755 | 1,615 |
| 3 | 980 | 1,175 | 1,275 | 1,320 | 1,245 | 1,760 | 2,155 | 2,185 | 2,325 | ------ | 3,780 | 3,675 | 3,585 | 3,175 | 2,005 |
| 4 | 1,230 | 1,520 | 1,555 | 1,670 | 1,625 | 2,225 | 2,615 | 2,680 | 2,730 | ------ | 3,670 | 3,575 | 3,300 | 2,875 | 2,080 |

EXAMPLE V

N - (p - phenylaminophenyl) - 2 - carboxycyclohex - 4 - enecarboxamide was evaluated as an antiozonant additive as follows:

An SBR sidewall stock rubber of the recipe—

| Ingredient: | Parts by weight |
|---|---|
| SBR 1502 | 100.00 |
| Furnex | 10.00 |
| Statex M | 30.00 |
| Zinc oxide | 3.00 | inasmuch as the results for such mixtures are greater than the sum of the results for Samples 1 and 2, where each additive is used separately.

TABLE III

| | Hours to first crack elongation | | |
|---|---|---|---|
| Sample | 10% | 15% | 20% |
| 1 | 1-2 | 1-2 | 1-2 |
| 2 | >144 | 3-4 | 1-2 |
| 3 | >144 | >144 | 7-24 |

I claim as my invention:
1. A compound having the formula:

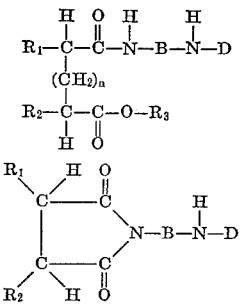

where $R_1$ and $R_2$ are independently selected from the group consisting of hydrogen and alkyl of from 1 to about 5 carbon atoms; $R_3$ is hydrogen or alkyl of from 1 to about 16 carbon atoms; $n$ is an integer of 0 to about 6; B is a phenylene group; and D is alkyl of from 1 to about 10 carbon atoms, cycloalkyl of from 5 to about 7 carbon atoms, phenyl or naphtyl.

2. A compound having the formula

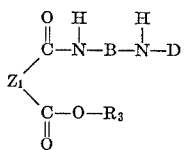

or

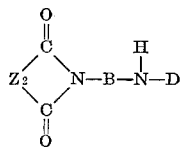

where $Z_1$ is a bivalent carbocyclic radical derived from the group consisting of cyclopentane, cyclohexane, cycloheptane, cyclopentene, cyclohexene, cycloheptene, benzene and naphthalene, the two acyl groups being attached to different carbon atoms of the carbocyclic ring which are free of ethylenic unsaturation; $Z_2$ is the same as $Z_1$ but further characterized in that the two acyl groups are attached to ortho carbon atoms of the carbocyclic ring; $R_3$ is hydrogen or alkyl of from 1 to about 16 carbon atoms; B is a phenylene group; and D is alkyl of from 1 to about 10 carbon atoms, cycloalkyl of from 5 to about 7 carbon atoms, phenyl or naphthyl.

3. The compound according to claim 2 characterized in that $Z_1$ and $Z_2$ are derived from cyclohexene.

4. The compound according to claim 2 characterized in that $Z_1$ and $Z_2$ are derived from benzene.

5. The compound according to claim 2 characterized in that D is alkyl of from 1 to about 10 carbon atoms.

6. The compound according to claim 2 characterized in that D is phenyl.

7. The compound according to claim 2 characterized in that D is cycloalkyl of from 5 to about 7 carbon atoms.

8. The compound according to claim 2 characterized in that it is N(p-phenylaminophenyl)-1,2-cyclohex-4-ene-dicarboximide.

9. The compound according to claim 2 characterized in that it is N-(p-phenylaminophenyl)-2-carboxycyclohex-4-enecarboxamide.

10. The compound according to claim 2 characterized in that it is N-(p-phenylaminophenyl)-2-carbomethoxycyclohex-4-enecargoxamide.

References Cited

UNITED STATES PATENTS 3,389,166  6/1968  Loev _____ 260—471

LORRAINE A. WEINBERGER, Primary Examiner

L. A. THAXTON, Assistant Examiner

U.S. Cl. X.R.

252—51.5, 401; 260—45.85, 326.5, 468, 471, 483, 518